US011061666B1

(12) United States Patent
Pohl et al.

(10) Patent No.: US 11,061,666 B1
(45) Date of Patent: Jul. 13, 2021

(54) DISTRIBUTING COMPUTING TASKS TO INDIVIDUAL COMPUTER SYSTEMS

(71) Applicant: INTERNATIONAL BUSINESS MACHINES CORPORATION, Armonk, NY (US)

(72) Inventors: Thomas Pohl, Weil im Schoenbuch (DE); Martin Tröster, Renningen (DE); Angel Nunez Mencias, Stuttgart (DE); Jakob Christopher Lang, Tuebingen (DE); Herwig Elfering, Rheinau (DE)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 16/735,836

(22) Filed: Jan. 7, 2020

(51) Int. Cl.
| | |
|---|---|
| *G06F 8/61* | (2018.01) |
| *G06F 8/71* | (2018.01) |
| *G06F 11/07* | (2006.01) |
| *G06N 5/02* | (2006.01) |
| *G06F 9/54* | (2006.01) |
| *G06F 9/4401* | (2018.01) |

(52) U.S. Cl.
CPC ............. *G06F 8/71* (2013.01); *G06F 8/63* (2013.01); *G06F 9/4411* (2013.01); *G06F 9/541* (2013.01); *G06N 5/025* (2013.01); *G06F 11/073* (2013.01)

(58) Field of Classification Search
None
See application file for complete search history.

(56) References Cited

U.S. PATENT DOCUMENTS

| | | | | |
|---|---|---|---|---|
| 2002/0092008 | A1* | 7/2002 | Kehne | G06F 8/65 717/168 |
| 2004/0205745 | A1* | 10/2004 | Piazza | G06F 8/63 717/168 |
| 2006/0174055 | A1* | 8/2006 | Flynn | G06F 9/4406 711/100 |
| 2008/0256530 | A1* | 10/2008 | Armstrong | G06F 9/45533 717/174 |
| 2013/0318397 | A1 | 11/2013 | Jamison | |
| 2014/0239171 | A1* | 8/2014 | Platt | H01J 49/26 250/282 |

(Continued)

OTHER PUBLICATIONS

Brinkmann, "Verifying Embedded Designs with Cloud Computing", Embedded Computing Design, Dec. 1, 2013, 8 pages.

(Continued)

*Primary Examiner* — Philip Wang
(74) *Attorney, Agent, or Firm* — Teddi E. Maranzano

(57) ABSTRACT

A computer-implemented method for distributing computing tasks to individual computer systems from a first pool of first computer systems, characterized by controllers executing a specific firmware with a gateway to receive commands via a network and an orchestration unit, whereby in response to a request to perform a computing task, an available and suitable first computer system is selected. An available second computer system is selected from a second pool. A firmware image corresponding to a requested controller firmware level is selected, using a gateway connector to send commands to the gateways. A network connection is established between the gateway in the controller of the first computer system and the gateway connector in the second computer system. Execution of the firmware image is triggered.

18 Claims, 7 Drawing Sheets

(56) References Cited

U.S. PATENT DOCUMENTS

2016/0019069 A1* 1/2016 Wei ..................... G06F 9/4416
 713/2
2019/0041830 A1 2/2019 Yarvis
2020/0310779 A1* 10/2020 Van Heuklon ............ G06F 8/65

OTHER PUBLICATIONS

Furuichi et al., "Next Generation of Embedded System on Cloud Computing", Procedia Computer Science, vol. 35, 2014, pp. 1605-1614, Accessed on Nov. 6, 2019, ScienceDirect.
Mell et al., "The NIST Definition of Cloud Computing", Recommendations of the National Institute of Standards and Technology, Special Publication 800-145, Sep. 2011, 7 pages.
Mora et al., "Flexible Framework for Real-Time Embedded Systems Based on Mobile Cloud Computing Paradigm", Research Article, Hindawi Publishing Corporation, Mobile Information Systems, vol. 2015, Article ID 652462, 14 pages, Received Dec. 9, 2014; Revised May 29, 2015; Accepted Jun. 2, 2015.

* cited by examiner

DISTRIBUTING COMPUTING TASKS TO INDIVIDUAL COMPUTER SYSTEMS

The present invention relates in general to data processing systems, and in particular, to distributing computing tasks to individual computer systems.

BACKGROUND

Testing multiple versions of an embedded controller operating system and software against a real system is resource intensive. Preparation of test systems may require disruptive install of the operating system, installing required firmware/software and system customization. Creating snapshots for debugging in e.g. simulation may not be possible. This often requires time consuming recreation of a failing scenario with high efforts. If end of life of a physical controller is reached, a field roll of existing hardware is required. Alternatively, a buy-ahead of hardware for replacement is necessary. Both produces high costs in maintenance of a computer system.

In today's firmware verification, it is advantageous to detect firmware and hardware issues as early as possible. One approach is the establishment of a fully automated continuous integration chain, staging unit test, function test, simulation and real hardware testing. In this chain, a significant time of the overall process is spent on updating the controller firmware on the system controllers.

SUMMARY

A computer-implemented method for distributing computing tasks to individual computer systems from a first pool of first computer systems is provided. The method includes selecting an available and suitable first computer system for the execution of the computing task from the first pool and reserving the first computer system for exclusive access. The method further includes selecting an available second computer system from the second pool of second computer systems suitable to execute the requested controller firmware level and connectable via the network to the first computer systems in the first pool, wherein the selection is based on quality of service criteria including network latency between the first computer system and the second computer system. The method further includes selecting a firmware image corresponding to the requested controller firmware level, wherein the selected unmodified controller firmware image is transparently connected via a gateway connector to send commands to the gateways in the controllers of the first computer systems in the first pool, establishing a network connection between the gateway in the controller of the first computer system and the gateway connector in the second computer system; and triggering the beginning of the test execution on the second computer system, using the virtual firmware image.

A computer program product for distributing computing tasks to individual computer systems in a first pool of first computer systems is provided. The computer program produce includes a computer readable storage medium having program instructions embodied therewith. The program instructions executable by a processor to cause the processor to perform the actions of: selecting an available and suitable first computer system for an execution of the computing task from the first pool, and reserving the first computer system for exclusive access; selecting an available second computer system having a virtual firmware level requested in a test execution from a second pool of second computer systems suitable to execute a controller firmware level requested in the test execution; establishing a network connection between the gateway in the controller of the first computer system and a gateway connector in the second computer system, wherein the gateway connector is a dedicated connection to the second computer system for the test execution of the virtual firmware image; and triggering the beginning of the test execution on the second computer system, using the virtual firmware image.

A computer system for execution of a data processing program is provided. The computer system provides: one or more processors, a computer-readable memory coupled to the one or more processors. The computer-readable memory includes instructions for: selecting an available and suitable first computer system for an execution of the computing task from the first pool, and reserving the first computer system for exclusive access; selecting an available second computer system having a virtual firmware level requested in a test execution from a second pool of second computer systems suitable to execute a controller firmware level requested in the test execution; establishing a network connection between the gateway in the controller of the first computer system and a gateway connector in the second computer system, wherein the gateway connector is a dedicated connection to the second computer system for the test execution of the virtual firmware image; triggering the beginning of the test execution on the second computer system, using the virtual firmware image.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments.

DETAILED DESCRIPTION

Figure 1:
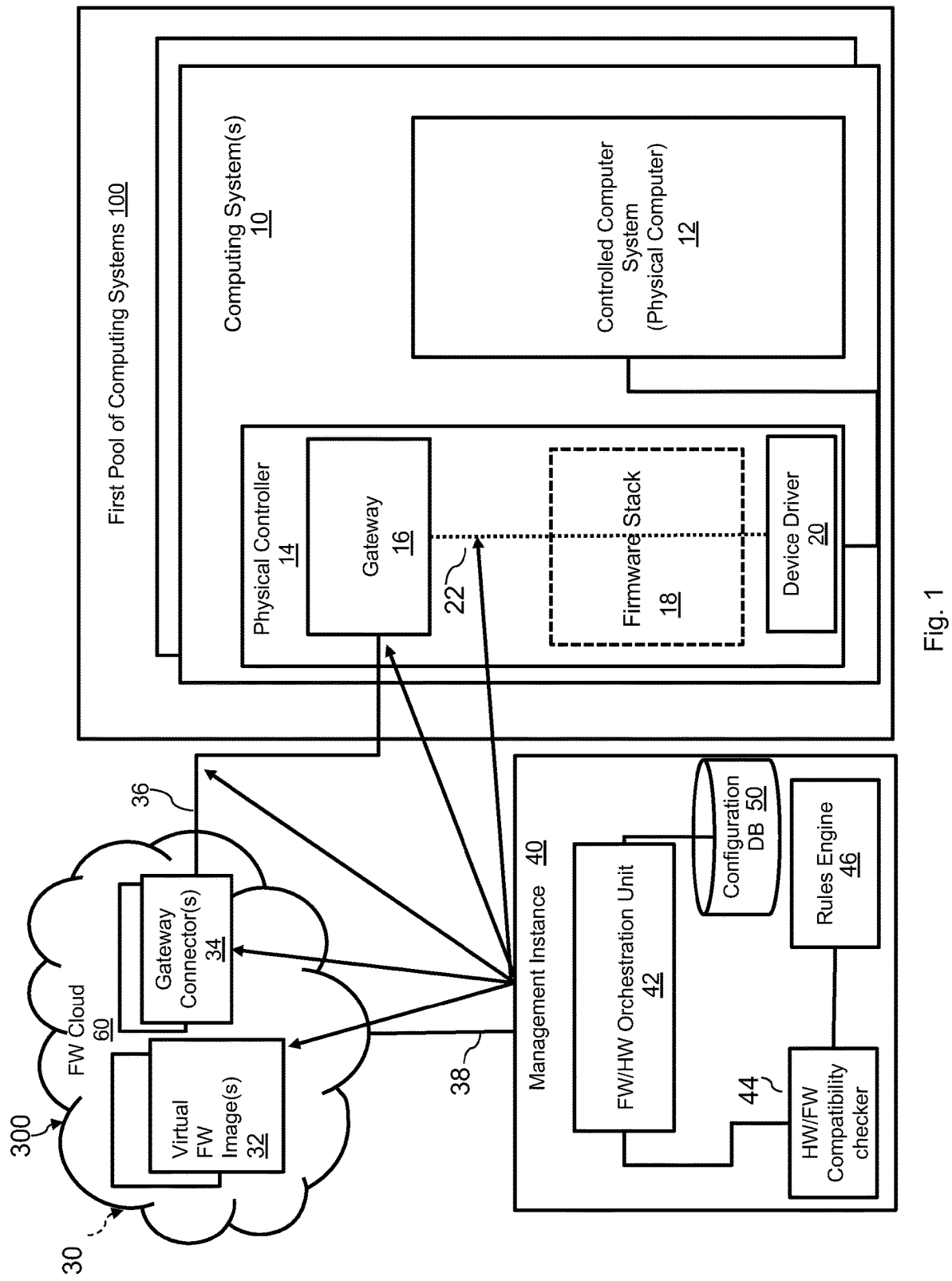
FIG. 1 depicts a computing topology as a first pool of first computer systems connected to a cloud computing infrastructure as a second pool of second computer systems with one or more firmware virtual images according to an embodiment of the invention.

In the drawings, like elements are referred to with equal reference numerals. The drawings are merely schematic representations, not intended to portray specific parameters of the invention. Moreover, the drawings are intended to depict typical embodiments of the invention and therefore should not be considered as limiting the scope of the invention.

The illustrative embodiments described herein provide a method for a computer-implemented method for distributing computing tasks to individual computer systems from a first pool of first computer systems, wherein each first computer system in the first pool comprises a physical computer for processing computing tasks and one or more physical controllers for managing the physical computer, and wherein the controllers use dedicated firmware, characterized by the controllers executing a specific firmware with a gateway to receive commands via a network and an orchestration unit. The illustrative embodiments may be used for the method comprising, in response to a request to perform a computing task on a first computer system with a dedicated controller firmware level, the request issued from a controller firmware image executed on a second computer system in a second pool of second computer systems. An available and compatible first computer system that is suitable for the execution of the computing task is selected from the first pool and reserving the first computer system for exclusive access. An available compatible second computer system from the second pool of second computer systems suitable to execute the requested controller firmware level and connectable via the network to the first computer systems in the first pool is selected. The selection is based on quality of service criteria including network latency between the first computer system and the second computer system. A firmware image corresponding to the requested controller firmware level is selected. The selected unmodified controller firmware image is transparently connected via a gateway connector to send commands to the gateways in the controllers of the first computer systems in the first pool. A network connection between the gateway in the controller of the first computer system and the gateway in the second computer system is established. Execution of the firmware image on the second computer system is triggered.

A method is described to minimize an engineering hardware test cycle and increase test hardware utilization during firmware development. This allows to test multiple versions of embedded controller software against a real system with acceptable efforts. In a firmware test system, new firmware is disruptive to any hardware and/or software layer above the firmware being tested. Therefore, it would be advantageous to isolate the firmware being tested from the hardware platform on which the testing system is executing.

This is achieved by introducing a new connectivity orchestration unit that takes allows to select a firmware level and an engineering hardware endpoint, matching hardware/firmware compatibility by rules and required quality of service. This comprises further the deployment of the firmware, the creation of virtual controller instances, as well as the configuration of a gateway on the existing engineering hardware and a gateway connector on the virtual controller to establish a secure connection.

The illustrative embodiments are sometimes described herein using particular technologies only as an example for the clarity of the description.

FIG. 1 depicts a computing topology as a first pool of computing systems (first pool) 100 first computer systems 10. As shown, there can be more than one first computer system 10 in the first pool 100. The first pool 100 is connected to a cloud computing infrastructure 60. A second pool 300 of cloud-based second computer systems 30 hosts virtual firmware image(s) 32. Each second computer system 30 hosts a virtual firmware image 32. The virtual firmware images 32 may be of different versions and can be intended for execution on different computing architectures. There can be duplicate copies of a virtual firmware image 32, for example if several simultaneous test executions require a particular image. This is because, as shown in FIG. 1, each instance of a virtual firmware image 32 is connected to the gateway 16 by a dedicated gateway connector 34. This allows the simultaneous testing of a particular virtual firmware image 32 in several test executions, without the test results in an execution environment impacting the test results in the other test execution environments.

The first pool 100 of first computer systems 10 includes mainframe computer systems and other hardware components with firmware, for example, a network switch. The first pool 100 can include hardware having firmware for specialized function, for example, an embedded controller in a microwave oven. Each first computer system 10 in the first pool 100 comprises a physical computer 12 for processing computing tasks and a physical controller 14 for managing the physical computer 12. The physical controller 14 may be a system level controller. The physical computer 12 may be a controlled computer system. The physical controller 14 uses firmware that is normally implemented in the firmware stack 18. To speed up testing, the firmware stack 18 is replaced in this embodiment by connecting a virtual firmware image 32 to the physical controller 14 via a gateway 16 that is connected to a gateway connector 34. In this setup the virtual firmware image 32 is acting instead of the firmware stack 18. The firmware stack 18 is represented by the dashed lines box, because it is not used by the physical controller 14 in this configuration. The physical controller 14 therefore comprises the gateway 16 that connects the virtual firmware image 32 to the computer system 10 replacing the firmware stack 18.

A management instance 40 includes a firmware/hardware orchestration unit 42, a hardware/firmware compatibility checker 44, a rules engine 46 and a configuration database 50. The management instance 40 may be implemented outside the first pool 100. The configuration database 50 includes at least a gateway table 52, a table 54 of firmware images, and a connection table 56, further described in FIGS. 2-4.

The physical controller 14 executes a specific firmware with a gateway 16 to receive commands via a network 36 and the orchestration unit 42.

The gateway 16 in the physical controller 14 of the first computer system 10 detects the physical computer 12 and establishes connectivity to the physical computer 12 via a device driver 20 of the physical controller 14.

The gateway 16 detects the underlying hardware and determines an identity of the physical computer 12. Identity factors include a system type, a serial number, and a system name. The gateway 16 retrieves an IP address from the network 36 and establishes a connection to the orchestration unit 42. The gateway 16 uses the IP address to automatically register the physical computer 12 to the orchestration unit 42. The gateway 16 starts a service listening to the network 36 on the retrieved IP address, and publishes an Application Programming Interface (API) for connectivity to the orchestration unit 42. The API includes functions for managing connections, such as starting a connection, stopping the connection, deleting the connection, and getting a status of the connection. The API is also used for administering and personalizing hardware instances. Information on the gateway 16 is stored in a gateway table 52, depicted in FIG. 4.

An example API may look like:
    handler reserveMachine(IP sourceIP, QoS acceptableQoS);
    startConnection(handler h); //throws an error if not latest handler stopConnection(handler h);
deleteConnection(handler h);
status getStatus(handler h); //return [bool connected, IP sourceIp, QoS data]
personalizeHW(MachineData userData); //write UUID into HW A second pool 300 of second computer systems 30 is implemented as the cloud computing infrastructure 60. The second computer systems 30 are implemented as a service on the cloud computing infrastructure 60. The management instance 40 is connected to the cloud computing infrastructure 60 by the connection 38, which is typically a network connection.

Several engineering hardware test cycles are usually performed during firmware development for a computer system 10. This consumes significant time of the hardware, thus blocking the hardware for other test work. The hardware is unavailable during the deployment of firmware because this is a disruptive process that requires the rebooting of the hardware to load the new firmware level into the physical hardware.

According to an embodiment of the invention these test cycles may be distributed as computing tasks to individual computer systems 30 in a second pool 300 which may be implemented in a cloud computing infrastructure 60.

In response to a request to perform such a computing task on a first computer system 10 with a dedicated controller firmware level, an available and compatible first computer system 10 is selected for the execution of the computing task from the first pool 100. The first computer system 10 may be reserved for exclusive access for this execution.

An available compatible second computer system 30 from a second pool 300 is selected, suitable to execute the requested controller firmware level. The selected second computer system 30 is connectable via the network 36 to the first computer systems 10. This selection is based on quality of service criteria including network latency between the first computer system 10 and the second computer system 30.

The quality of service may comprise at least the network latency between the physical computer 12 and instances of the second computer system 30, but may also comprise a bandwidth, a routing path, and hardware capabilities of the first computer system 10.

The quality of service, particularly as latency aspects, influences the interaction of firmware with real hardware. This is because some functionality of the firmware execution may produce error conditions if timeouts occur. Additionally, the firmware may be unable to react on interrupts in a timely fashion to prevent errors.

The management instance 40 sets up the network connection 36 between the physical controller 14 of the first computer system 10 and the second computer system 30 with an appropriate quality of service. For this purpose, the second computer system 30 is reserved for exclusive access.

A virtual firmware image 32 is selected from the one or more virtual firmware images 32 hosted on one of the cloud-based second computer systems 30 in the second pool 300. The selected virtual firmware image 32 uses a gateway connector 34 to send commands to the gateway 16 in the physical controller 14 of the first computer system 10. The virtual firmware image 32 is deployed as a virtual firmware image or a virtual machine. Information on the virtual firmware image 32 is stored in a table 54 of firmware images, depicted in FIG. 4. As shown in FIG. 1, there can be multiple virtual firmware images 32 and multiple gateway connectors 34. For each virtual firmware image 32, there is a corresponding gateway connector 34 to connect to the gateway 16.

A network connection 36 is established between the gateway 16 in the physical controller 14 of the first computer system 10 and the gateway connector 34 as a gateway in the second computer system 30.

The management instance 40 configures the physical controller 14 into bypass mode to trigger execution of the virtual firmware image 32 on the second computer system 30.

Figure 2:
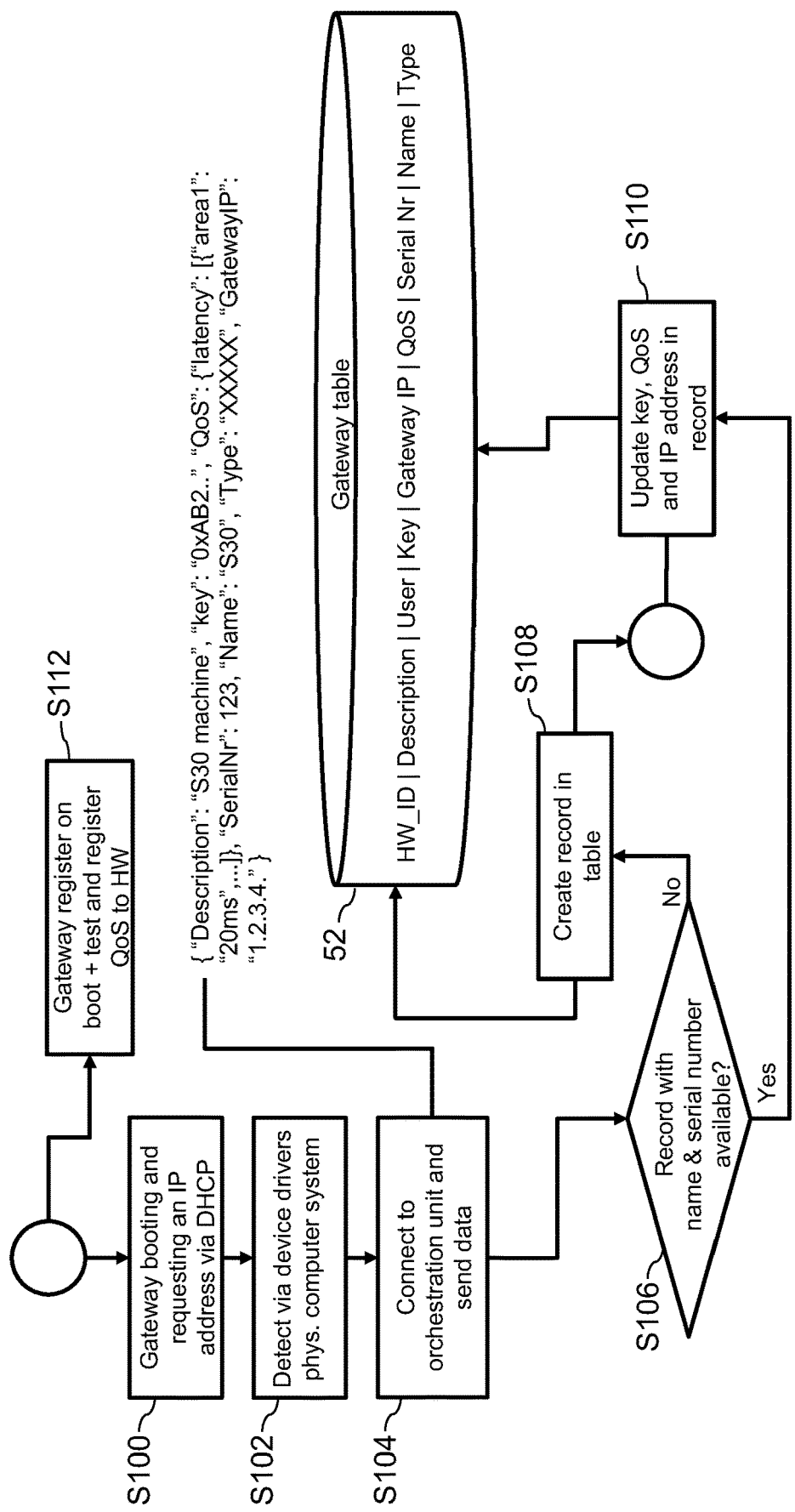
FIG. 2 depicts a flowchart for registration of a gateway to an orchestration unit according to an embodiment of the invention.

FIG. 2 depicts a flowchart for registration of a gateway 16 to an orchestration unit 42 according to an embodiment of the invention.

For registering the first computer system 10 to the orchestration unit 42 by the gateway 16, in step S100, the gateway 16 is booting and requesting an IP address from the network 36 via Dynamic Host Configuration Protocol (DHCP). However, any IP address assigning protocol, such as (R)ARP, DHCPv6, SLAAC, etc., can be used.

In step S102, the device driver 20 detects the physical computer 12. In step S104, the gateway 16 connects to the orchestration unit 42 and sends data. An example, as marked in FIG. 2, may be: description="S30 machine", key="0xAB2", Quality of Service (QoS)=latency: "in areal, 20 ms", serial number="123", name="S30", type="XXXXX", gateway IP="1.2.3.4.". Latency is shown as an example of QoS, as any parameter pertaining to QoS can be specified.

In step S106 the gateway 16 verifies that a data record with at least the system name and the serial number of the physical computer 12 exists in the gateway table 52. If this is not the case, in step S108, the gateway 16 creates the data record in the gateway table 52. The data record includes hardware ID, description, user, key, gateway IP, QoS, serial number, name and type.

If the data record exists, in step S106, at least the key, the QoS status and the IP address are updated in the data record.

Figure 3:
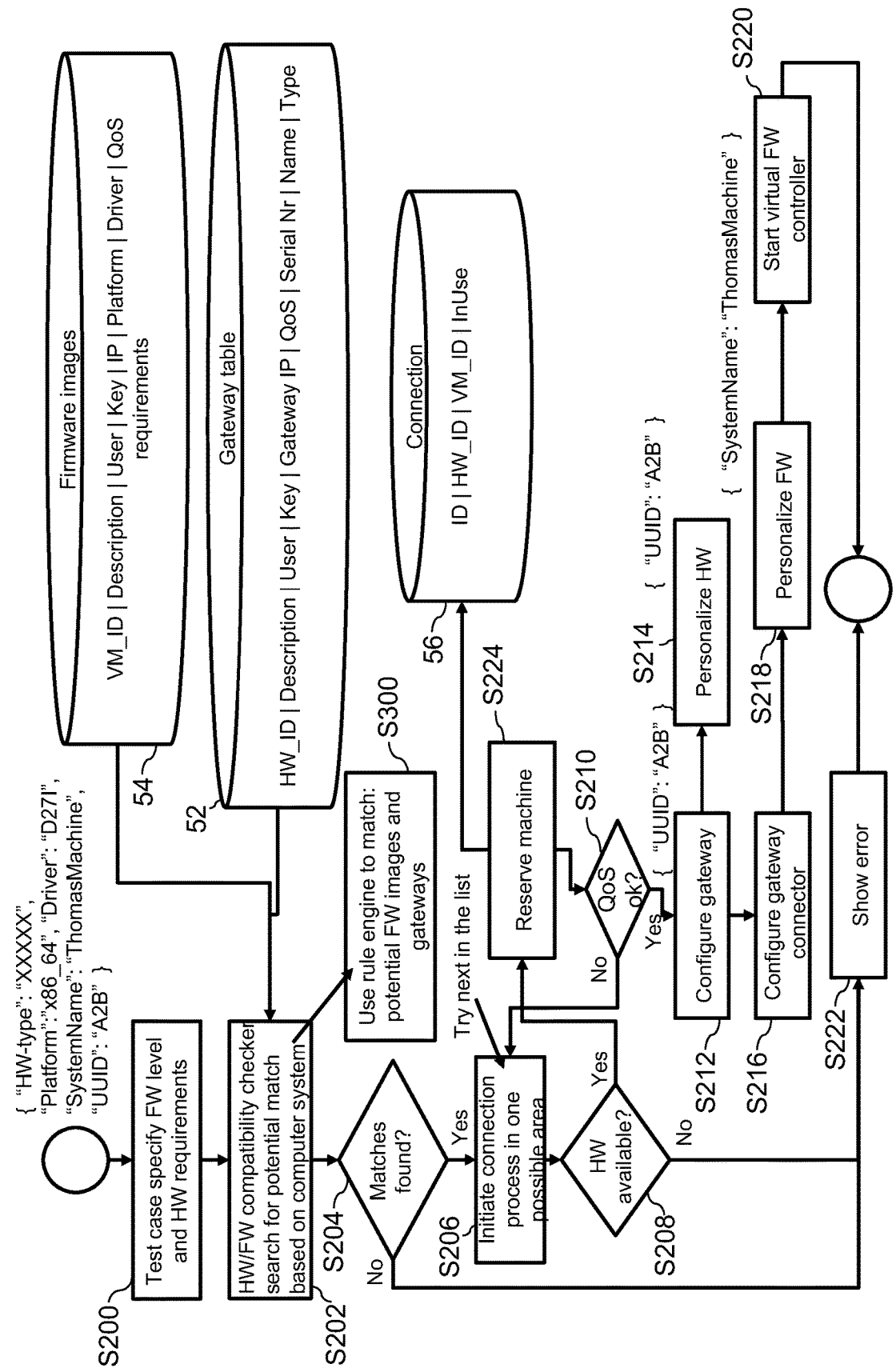
FIG. 3 depicts a flowchart for starting a firmware test as a computing task according to an embodiment of the invention.

FIG. 3 depicts a flowchart for starting a firmware test as a computing task according to an embodiment of the invention.

For starting the computing task on the second computer system 30 by the orchestration unit 42, in step S200 the test specifies the requested a controller firmware level and hardware requirements. An example, as marked in FIG. 3, may be: hardware type="XXXXX", platform="x86_64", driver="D27I", system name="ThomasMachine", UUID="A2B".

The compatibility checker 44 (FIG. 1) searches in step S202 for a potential match based on the first computer system 10 (FIG. 1) using a rules engine 46 (FIG. 1) for matching potential virtual firmware images 32 (FIG. 1) and gateway connectors 34 (FIG. 1). Functions of the rules engine 46 are described in FIG. 4. The compatibility checker 44 uses the gateway table 52 (FIGS. 2, 3) with information as described in FIG. 2 and a table of virtual images 54 (FIG. 3) where information like ID of a virtual image, description, user, key, IP, platform, driver, QoS requirements are specified.

If matches are found (step S204), then in step S206 a connection process to one of potentially many matching endpoints is initiated.

If a physical computer 12 is available in step S208, the compatibility checker 44 reserves a first computer system 10 in step S224. The reservation is made by an entry in a connection table 56 (FIG. 3) with, for example, an ID, a hardware ID, an ID of the virtual image, and an InUse flag.

In step S210 a required quality of service (QoS) is confirmed.

The driver 20 (FIG. 1) may describe in fact a matching firmware level for a specific hardware. The driver 20 knows that it needs to connect to a first computer system 10 with a certain QoS requirement, e.g. a 20 ms latency.

The gateway 16 (FIG. 1) may be connected to a specific first computer system 10. The gateway 16 detects the hardware characteristics, but also tests the QoS, e.g. latency to all various areas.

Figure 4:
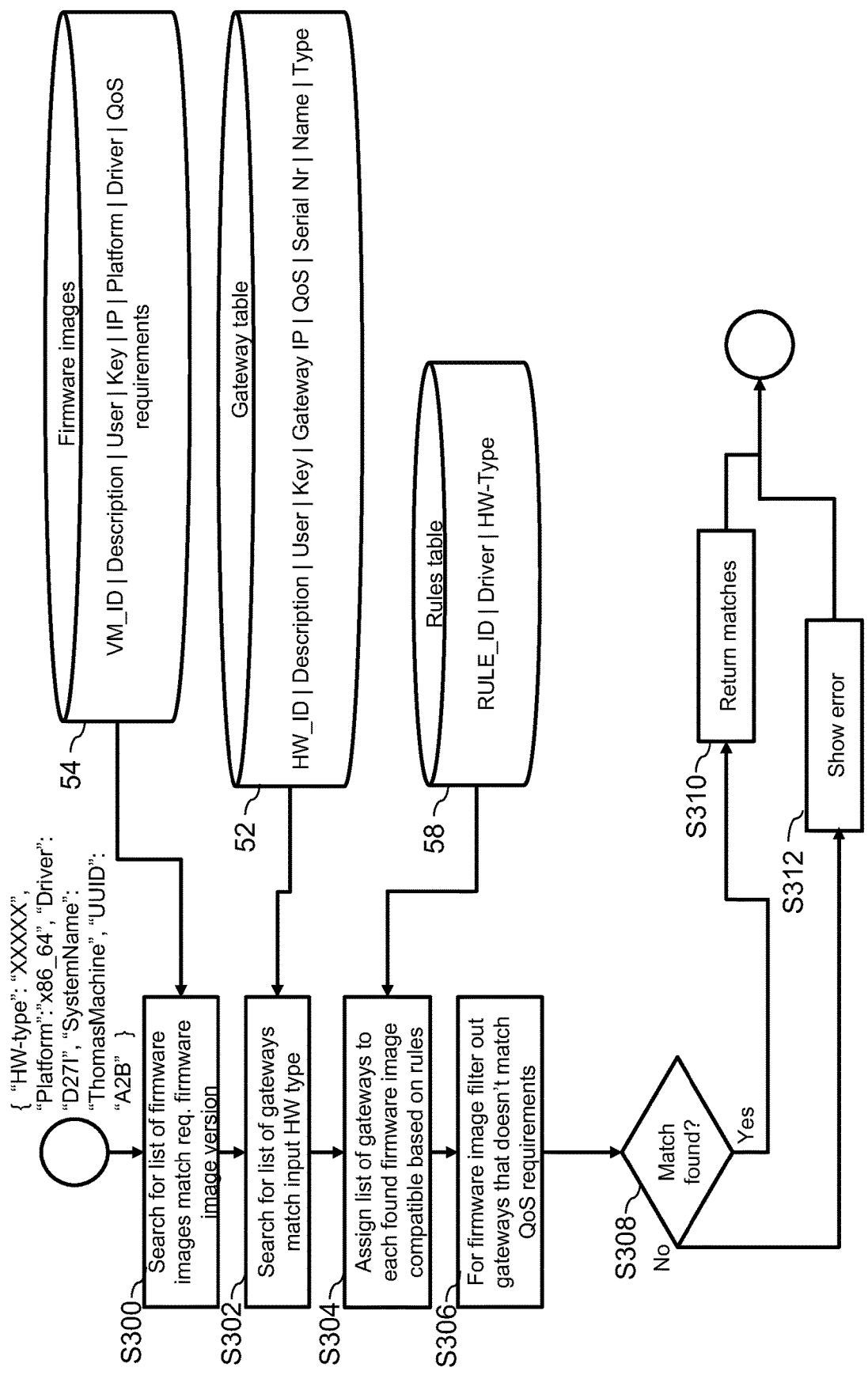
FIG. 4 depicts a flowchart for using a rules engine according to an embodiment of the invention.

After the filtering process described in FIG. 4, the management instance 40 (FIG. 1) instantiates the driver 20 (FIG. 1) in a memory area. The management instance 40 gets the IP assigned and then passes it to the gateway 16 (FIGS. 1, 2) via the reserveMachine( ) function of the API specified above, along with the acceptableQoS for that specific driver 20 (FIGS. 1, 2). The gateway 16 (FIGS. 1, 2) will test the latency to the IP address and if everything matches setup a monitoring of the connection 36 (FIGS. 1, 2) itself and returns a valid handler. Otherwise the error handling takes place and the next potential gateway 16 will be tried.

If QoS status cannot be confirmed, the next connection in the list is attempted in step S206.

If the required QoS status is confirmed, then in step S212 the gateway 16 (FIGS. 1, 2) of the first computer system 10, 11 (FIGS. 1, 2) is configured, in the example with a UUID="A2B", followed by personalizing the physical computer system 12 (FIGS. 1, 2) in step S214.

In step S216, the gateway connector 34 (FIGS. 1, 2) as a gateway connector of the second computer system 30, 31 (FIGS. 1, 2) is configured, followed by personalizing the firmware image 32 (FIGS. 1, 2) and the second computer system 30, 31 (FIGS. 1, 2), in the example with a system name="ThomasMachine".

In step S220, an instance controller of the firmware image 32 (FIGS. 1, 2) is started.

If hardware is not available in step S208, an error is reported in step S222 and the process ended.

FIG. 4 depicts a flowchart for using the rules engine 46 (FIG. 1) according to an embodiment of the invention.

Using the rules engine 46 (FIG. 1) for matching potential virtual firmware images 32 (FIG. 1) and gateway connectors 34 (FIG. 1) includes searching the table 54 of firmware images for firmware images matching a test input driver in step S300.

The same information as in FIG. 3 may be used as an input, hardware type="XXXXX", platform="x86_64", driver="D27I", system name="ThomasMachine", UUID="A2B".

In step S302, the rules engine 46 searches the gateway table 52 for a list of gateway connectors 34 matching the input hardware type. In step S304 a list of gateway connectors 34 is assigned to each found virtual firmware image 32 being compatible based on rules according to a rules table 58. The rules table 58 can include information, such as, rule ID, driver, hardware type.

In step S306, the rules engine 46 filters out gateway connectors 34 that do not match QoS requirements.

If no matches are found in step S308, an error is reported, step S312. Otherwise the matches are returned in step S310 to the calling process. However, any gateway may be accepted if no QoS filter is specified.

Figure 5:
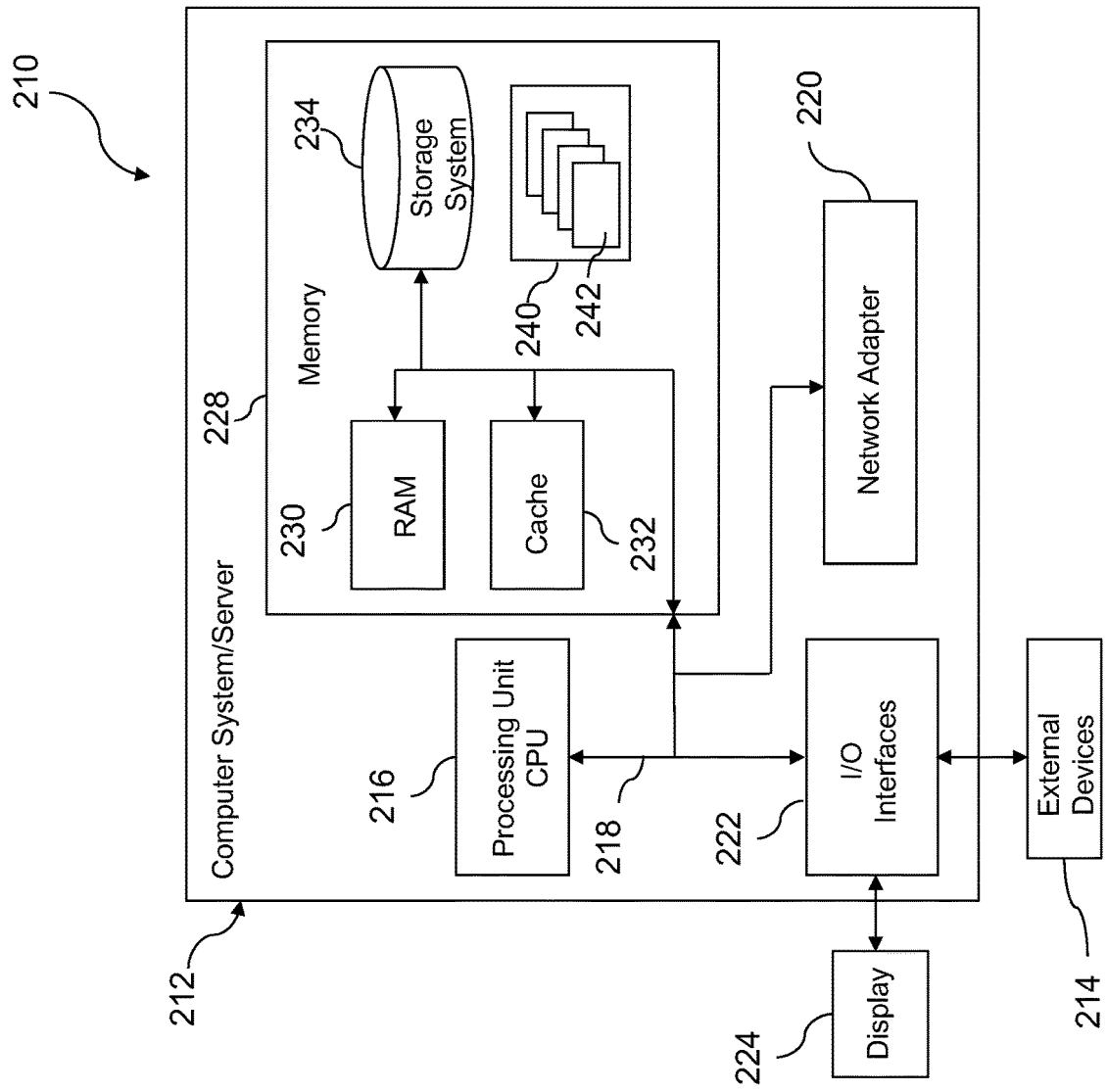
FIG. 5 depicts an example embodiment of a data processing system for executing a method according to the invention.

Referring now to FIG. 5, a schematic of an example of a data processing system 210 is shown. Data processing system 210 is only one example of a data processing system for implementing embodiments of the present invention, and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous computing system environments or configurations. Examples of computing systems, environments, and/or configurations that may be used with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

Figure 6:
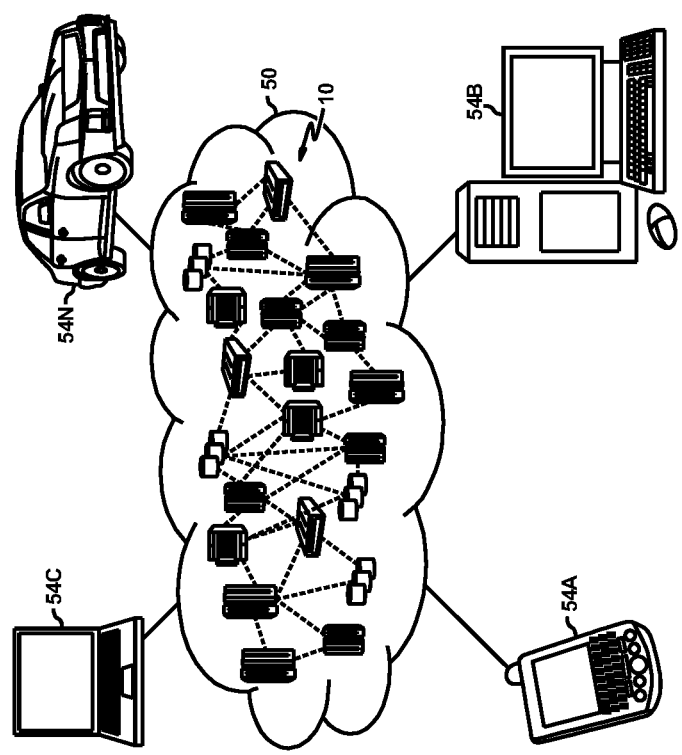
FIG. 6 depicts a cloud computing environment according to an embodiment of the present invention.

As shown in FIG. 6, computer system/server 212 in data processing system 210 is shown in the form of a computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
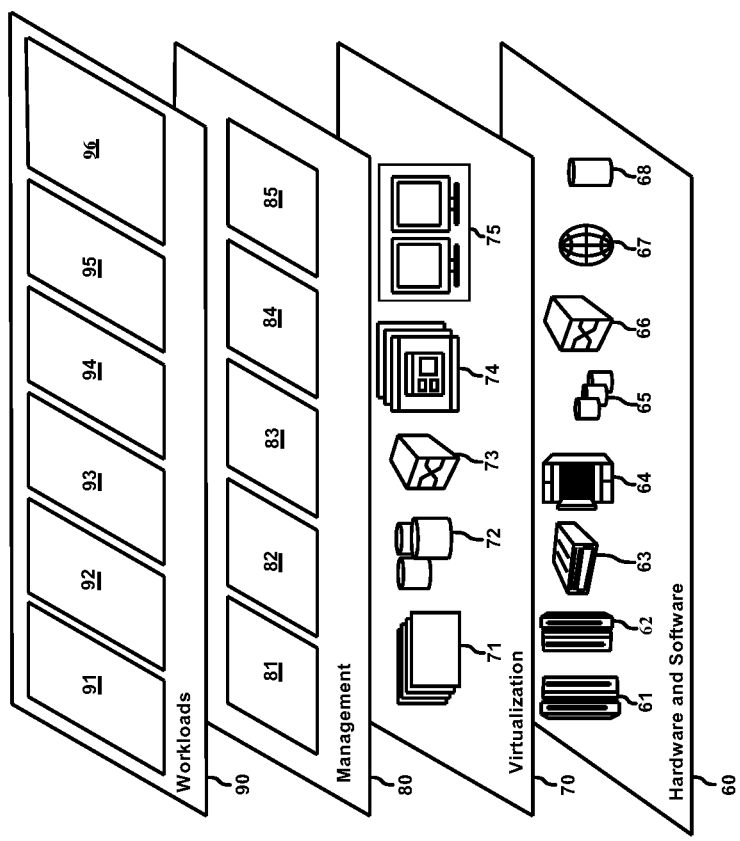
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and output management in a command line interface 96.

With reference now to accompanying drawings, exemplary embodiments of the present invention will be described. The exemplary embodiments are directed to a method, system and computer program product for command output management in a command line interface.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for distributing a computing task to individual computer systems in a first pool of first computer systems, comprising:
    selecting an available and suitable first computer system from the first pool of the first computer systems for an execution of the computing task, and reserving the first computer system for exclusive access;
    selecting a second computer system having a virtual firmware level requested in a test execution from a second pool of second computer systems suitable to execute a firmware level requested in the test execution, wherein a management instance comprising an orchestration unit, a hardware/firmware compatibility checker, a rules engine and a configuration database manages selection of the virtual firmware image from the second computer system and wherein the management instance configures a controller into a bypass mode for triggering execution of the firmware image on the second computer system, thereby bypassing a physical firmware stack installed on the first computer system;

establishing a network connection between a gateway in a controller of the first computer system and a gateway connector in the second computer system, wherein the gateway connector is a dedicated connection to the second computer system for the test execution of a virtual firmware image; and triggering a beginning of the test execution on the second computer system, using the virtual firmware image.

2. The method according to claim 1, further the second pool of second computer systems being implemented as a cloud computing infrastructure executing virtual firmware images.

3. The method according to claim 2, further the second pool of second computer systems being implemented as infrastructure as a service on the cloud computing infrastructure.

4. The method according to claim 1, wherein the management instance sets up the network connection between the controller of the first computer system and the second computer system, based on a quality of service specified in the test execution.

5. The method according to claim 1, wherein the gateway in the controller of the first computer system detects the physical computer system and establishes connectivity to the physical computer system via a device driver of the controller.

6. The method according to claim 5, wherein the gateway in the controller of the first computer system determines an identity of the physical computer system comprising at least a system type, a serial number, and a system name.

7. The method according to claim 5, wherein the gateway in the controller of the first computer system retrieves an IP address from the network and establishes a connection to an orchestration unit.

8. The method according to claim 5, wherein the gateway in the controller of the first computer system automatically registers the physical computer system to an orchestration unit.

9. The method according to claim 7, wherein the gateway in the controller of the first computer system starts a service listening to the network on the retrieved IP address and comprises an Application Programming Interface (API) for the orchestration unit.

10. The method according to claim 9, wherein the API comprises at least functions for starting the connection, stopping the connection, deleting the connection, getting a status of the connection, and personalizing hardware instances.

11. The method according to claim 5, further registering the first computer system to an orchestration unit by the gateway, comprising:
the gateway booting and requesting an IP address from the network via DHCP;
detecting the physical computer system via a device driver;
connecting to the orchestration unit and sending data;
verifying that a data record with at least a system name and a serial number of the physical computer system is available; if this is not the case, creating the data record in a gateway table;
updating at least a key, a quality of service status and the IP address in the data record.

12. The method according to claim 5, further starting the computing task on the second computer system by an orchestration unit, comprising:
specifying a controller firmware level and hardware requirements;
a compatibility checker searching for a potential match based on the first computer system using a rules engine for matching potential firmware images and gateways;
initiating a connection process to one of potentially many matching endpoints;
reserving the first computer system if a physical computer system is available;
confirming a required quality of service;
configuring the gateway of the first computer system and personalizing the physical computer system;
configuring the gateway connector of the second computer system and personalizing the gateway connector and the second computer system; and
starting an instance of the virtual firmware image.

13. The method according to claim 12, further using a rules engine for the matching potential firmware images and gateways, comprising:
searching a table of firmware images for the matching firmware images that match a requested firmware image version;
searching the gateway table for a list of gateway connectors matching an input hardware type;
assigning a list of gateway connectors to each found firmware image being compatible based on rules according to a rules table;
filtering out gateway connectors not matching quality of service requirements for a specific firmware image.

14. The method according to claim 5, wherein a quality of service comprises at least a network latency between the physical computer system and instances of the second computer system.

15. The method according to claim 14, wherein the quality of service comprises at least one of a bandwidth, a routing path, and hardware capabilities of the first computer system.

16. The method according to claim 5, wherein a configuration database comprises a gateway table, a table of firmware images, and a connection table.

17. A computer program product for distributing a computing task to individual computer systems in a first pool of first computer systems, comprising a computer readable storage medium having program instructions embodied therewith, the program instructions executable by a processor to cause the processor to perform:
selecting an available and suitable first computer system for an execution of the computing task from the first pool of the first computer systems, and reserving the first computer system for exclusive access;
selecting an available second computer system having a virtual firmware level requested in a test execution from a second pool of second computer systems suitable to execute a controller firmware level requested in the test execution, wherein a management instance comprising an orchestration unit, a hardware/firmware compatibility checker, a rules engine and a configuration database manages selection of the virtual firmware image from the second computer system and wherein the management instance configures a controller into a bypass mode for triggering execution of the firmware image on the second computer system, thereby bypassing a physical firmware stack installed on the first computer system;

establishing a network connection between a gateway in a controller of the first computer system and a gateway connector in the second computer system, wherein the gateway connector is a dedicated connection to the second computer system for the test execution of the virtual firmware image; and triggering a beginning of the test execution on the second computer system, using the virtual firmware image.

18. A computer system for execution of a data processing program comprising: one or more processors, a computer-readable memory coupled to the one or more processors, the computer-readable memory comprising instructions for:

selecting an available and suitable first computer system for an execution of a computing task from a first pool, and reserving the available and suitable first computer system for exclusive access;

selecting an available second computer system having a virtual firmware level requested in a test execution from a second pool of second computer systems suitable to execute a controller firmware level requested in the test execution, wherein a management instance comprising an orchestration unit, a hardware/firmware compatibility checker, a rules engine and a configuration database manages selection of the virtual firmware image from the second computer system and wherein the management instance configures a controller into a bypass mode for triggering execution of the firmware image on the second computer system, thereby bypassing a physical firmware stack installed on the first computer system;

establishing a network connection between a gateway in a controller of the first computer system and a gateway connector in the second computer system, wherein the gateway connector is a dedicated connection to the second computer system for the test execution of the virtual firmware image; and triggering a beginning of the test execution on the second computer system, using the virtual firmware image.

\* \* \* \* \*